United States Patent [19]

Farmer

[11] 4,376,073
[45] Mar. 8, 1983

[54] METHOD AND APPARATUS FOR DESOLVENTIZING RESIDUAL SOLIDS AFTER OIL EXTRACTION THEREFROM

[75] Inventor: Richard D. Farmer, River Ridge, La.

[73] Assignee: Bunge Corporation, New York, N.Y.

[21] Appl. No.: 207,668

[22] Filed: Nov. 17, 1980

[51] Int. Cl.$^3$ ............................. A23J 1/02; A23J 1/14
[52] U.S. Cl. ............................. 260/123.5; 260/112 R; 426/656
[58] Field of Search ................. 260/112 R, 123.5; 426/656

[56] References Cited

U.S. PATENT DOCUMENTS

| | | | |
|---|---|---|---|
| 545,900 | 9/1895 | Maertens | 264/490 |
| 2,467,402 | 4/1949 | Pascal | 106/154 |
| 2,469,147 | 5/1949 | Beckel et al. | 260/412.4 |
| 2,567,179 | 9/1951 | Bonotto | 260/412.3 |
| 2,609,299 | 9/1952 | Singer | 99/98 |
| 3,064,018 | 11/1962 | Verrando Bruera | 260/412.4 |
| 3,408,374 | 10/1968 | Cavanagh et al. | 260/412.4 |
| 3,966,982 | 6/1976 | Becker | 426/430 |
| 3,993,535 | 11/1976 | Karnofsky | 426/430 |
| 4,190,577 | 2/1980 | Steele | 260/123.5 |

*Primary Examiner*—P. Short
*Attorney, Agent, or Firm*—James D. Fornari

[57] ABSTRACT

A method and apparatus for desolventizing residual solids after the oil or fat is extracted therefrom, wherein oil-bearing vegetable or fatty animal material has its oil or fat extracted by an extraction solvent to form an oil or fat solvent mixture, referred to as a "miscella," and extraction solvent impregnated residual solids. The oil or fat is separated from the miscella by heat and vacuum produced by ejector steam, which ejector steam acquires extraction solvent vapor as a result thereof. The solvent-vapor laden waste ejector steam, in conjunction with additional steam from a boiler system, is applied directly to the extraction solvent impregnated residual solids. The combined solvent-vapor laden waste ejector steam and boiler steam evaporate the extraction solvent from the impregnated residual solids and desolventize them to render them fit for consumption or other industrial processes.

12 Claims, 2 Drawing Figures

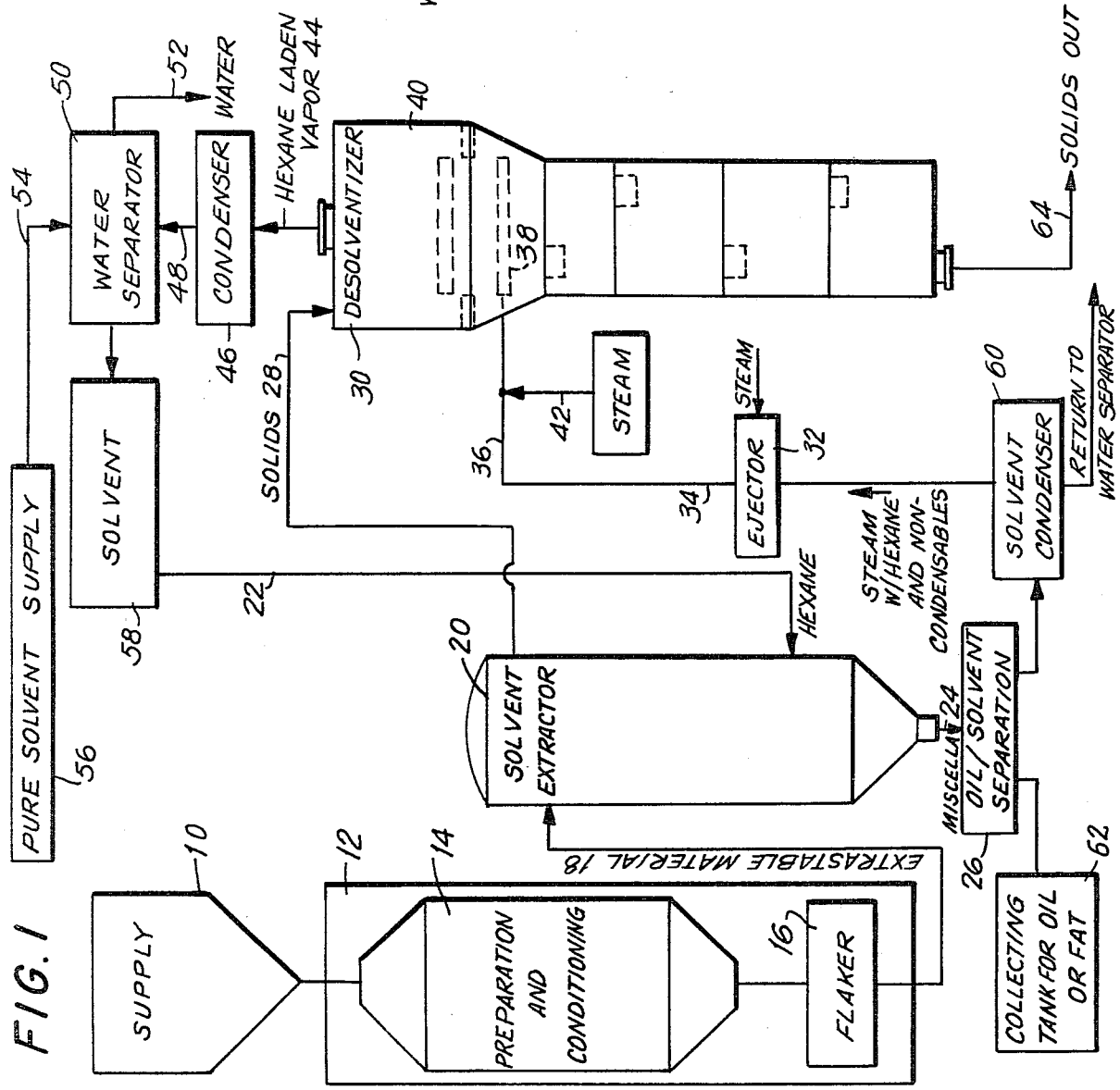

METHOD AND APPARATUS FOR DESOLVENTIZING RESIDUAL SOLIDS AFTER OIL EXTRACTION THEREFROM

BACKGROUND OF THE INVENTION

This invention relates to the treatment of oleaginous seed or fatty animal material, and more particularly to the treatment of defatted oleaginous seed or animal material to form a desolventized proteinaceous product which may be recovered and used industrially.

Oleaginous seed materials, such as soybeans, cottonseed, peanuts, sesame seeds, sunflower seeds, rape seeds, and the like, contain proteinaceous material of a highly nutritious nature and have found many uses in the plastics, paper and food industry. Soybeans, for example, after oil extraction, have been desolventized to recover the proteinaceous matter for various and diverse industrial processes.

Traditionally, the extraction of fats and oils has been and continues to be effected by means of washing the fat and oil-containing substances with a suitable liquid extraction solvent until the desired concentration of the resulting solution is obtained. This solution is then treated in evaporators and condensers which respectively separate the extraction solvent in vapor form from the solution and convert the vapor back to liquid form for re-use in the extraction process. The defatted residual solids left after the oil or fat is extracted are generally impregnated with extraction solvent, thereby rendering them unusable as a source of nutritious protein, until desolventizing is accomplished.

A complete proteinaceous or carbohydrate extraction process necessarily includes an extraction step, a spent flake desolventizing step, and a miscella evaporation step. The final use to which the solvent impregnated residual solids are to be put will determine the nature and type of desolventizing step which is employed. In particular, the defatted flakes may be contacted with an acidic solution to dissolve the nonproteinaceous matter, including certain enzyme systems, ash, flavoring ingredients and carbohydrates with the residual substance being utilized as a proteinaceous composition in the food industry. Such a system is described in U.S. Pat. No. 2,881,076 to Sair. Alternatively or in conjunction with the above, the defatted flakes may be treated with an aqueous alcohol solution to extract the nonproteinaceous matter (primarily carbohydrates). However, such processes suffer from large liquid-to-solid ratios which place excessive loads on the desolventizer apparatus. Moreover, the steam requirements to recover the solvent have proven to be excessive. The requirements for additional heat transfer capabilities in the process result in massive expenditures of heat. The spent flake desolventizing step may also be comprised of the application of superheated steam in a partial vacuum to evaporate the extraction solvent from the spent flakes and carry it out of the desolventizer in conjunction with the steam.

Traditionally, the miscella of fat or oil in the extraction solvent is separated by use of heat and a vacuum provided by a steam ejector to produce oil and solvent-laden waste ejector steam. The solvent-laden waste ejector steam is then treated in condensers which convert the vapor back to a liquid form for use in the extraction process. The solvent then must be reheated in order to be re-used in the extraction process. This results in substantial heat loss, as well as requiring additional heat transfer capabilities within the processes.

OBJECTS AND SUMMARY OF THE INVENTION

Accordingly, it is an object of this invention to provide an improved process and apparatus for treating oleaginous seed and fatty animal material which overcomes the above-described difficulties and inefficiencies.

More particularly, it is an object of this invention to provide an improved process and apparatus for treating oleaginous seed and fatty animal material in which the solvent-laden waste ejector steam is applied directly to the solvent impregnated residual solids to desolventize the residual solids.

It is still another object of this invention to provide an efficient method and apparatus for desolventizing residual solids by the direct use of solvent-laden waste ejector steam, in conjunction with steam from a boiler, which are mixed and applied directly to the solvent impregnated residual solids to desolventize those solids.

It is yet another object of this invention to provide an improved process and apparatus with greatly reduced steam requirements for the removal of an organic solution from solvent impregnated residual solids.

A further object of this invention is to provide an improved process and apparatus for desolventizing solvent impregnated residual solids in a process for extracting proteinaceous and nonproteinaceous matter from defatted oleaginous seed material in which solvent-vapor laden waste ejector steam is applied directly to the residual solids in a desolventizer-toaster apparatus to remove the solvent from the residual solids.

It is a broadly preferred embodiment of this invention to provide a process and apparatus for treating oleaginous seed material, such as soybean flakes, with a suitable liquid solvent, such as hexane, which process and apparatus includes an extraction phase, a desolventizing phase, and a miscella treatment phase. In particular, the soybeans are heated in a conditioner to reduce their moisture content and soften them. The hulls, which become partially detached from the soybeans, may be removed before or after conditioning. The beans themselves may be flaked to resemble wafers to provide more surface area. The flaked beans are then placed into an extractor such as a Rotocel, and during this extraction phase, the oleaginous seed material is subjected to contact with a liquid solvent, usually hexane.

The hexane extracts the oil from the beans and results in an oil-solvent solution. The term "miscella", as used herein, refers to a solution of extracted soluble material, such as fat or oil, in an extraction solvent, such as hexane.

As a result of the extraction operation, there is left a quantity of spent flake which is impregnated with an amount of solvent. The solvent must be removed from the spent flake before that flake may be used for food or in other industrial processes.

The miscella is separated in a partial vacuum provided by a steam ejector resulting in finished oil or fat being recovered from the miscella and a quantity of solvent being condensed therefrom. The ejector steam which is used in the miscella treatment step acquires a certain amount of solvent and noncondensable material. That waste ejector steam is applied directly to the solvent impregnated spent flake in a desolventizer toaster. The extraction solvent impregnating the spent flake is vaporized by the direct contact with the solvent-laden waste ejector steam in conjunction with additional quantities of boiler steam, as required. The solvent-laden waste ejector steam may be introduced through perforated plates in the heating or sparging deck of the desolventizer-toaster or by way of nozzles dispersed within the desolventizer-toaster.

The desolventized solids are removed from the desolventizer while the hexane-laden vapor withdrawn therefrom is condensed and the water then separated therefrom. The direct application of solvent-vapor laden waste ejector steam which is the subject of this invention can, by appropriate regulation, reduce the expenditure of steam by as much as 20 per cent in a commercial desolventizer-toaster.

In the specification and the accompanying drawings, Applicant has shown the described several preferred embodiments of his invention and has suggested various alternatives and modifications thereto, but it is to be understood that these are not intended to be exhaustive and that many changes and modifications can be made within the scope of the invention. These suggestions herein are selected and included for purposes of illustration in order that others skilled in the art will more fully understand the invention and principles thereof and will thus be enabled to modify it and embody it in a variety of forms, each as may be best suited to the conditions of a particular use.

BRIEF DESCRIPTION OF THE DRAWINGS

In the accompanying drawings:

FIG. 1 is a schematic flow diagram of one embodiment of a process and apparatus of the present invention illustrating the injection of solvent-laden waste ejector steam through perforated plates in the sparging deck of a desolventizer; and, FIG. 2 is a plan view of a nozzle system for use in the desolventizer to introduce the solvent-laden waste ejector steam in accordance with another embodiment of the present invention.

BRIEF DESCRIPTION OF A PREFERRED EMBODIMENT

Referring to FIG. 1, there is shown a schematic flow diagram of a process and apparatus illustrating the injection of solvent-laden waste ejector steam into a desolventizer according to a preferred embodiment of the invention. It is to be understood that equipment such as pumps, valves, indicators, pressure fittings and the like have been omitted from the drawings to facilitate the description thereof and that the placing of such equipment in appropriate places is deemed to be within the scope of those skilled in the art. For illustrative purposes only, the process and apparatus of the present invention will be described with reference to the treatment of soybean and particularly, defatted soybean flake. However, it is understood that other oleaginous seed material, as well as fat-bearing material, may be used. The term "defatted soybean flakes" means the residue or residual solids from the extraction of oil from soybean or soybean flakes, using hexane or other solvents in a so-called solvent extraction process. Among other things, such soybean flakes contain protein, carbohydrates, fiber, and certain quantities of other materials, including ash.

Referring to FIG. 1, a supply of the substance on which the extraction operation is to be performed is enclosed in a supply hopper 10. The soybeans, for purposes of illustration, are passed to a preparation area 12 which may employ, among other devices, a conditioner 14 to heat and reduce the moisture content of the soybeans to an acceptable level, in the order of 10 to 15 per cent by weight. As part of the preparation and conditioning, a flaker 16 may be employed to flake the conditioned soybeans and accordingly, expose a greater surface area to extraction solvent, thereby rendering the oil extraction more efficient. The substance may also be crushed, pulverized, crumbled and otherwise conventionally prepared as desired.

Extractable material 18 which is passed through the preparation and conditioning area 12 is introduced into a stage contacter or extractor 20. The flakes of extractable material 18 may be passed in concurrent contact with an extraction solvent stream 22 in the extractor 20. The concentration of extractable solids in the extraction is between 30 and 70 per cent, and it is preferable that it be from 40 to 50 per cent. The extraction is also preferably carried on at a temperature of between 110 and 145 degrees Farenheit and preferably between 135 and 145 degrees Farenheit. The entire extraction should take from 20 to 80 minutes and preferably about 40 minutes, and the ratio of solvent to flake of from between 0.7:1 and 4:1 and preferably about 0.95:1.

The extraction phase results in a miscella 24 which is withdrawn from the extractor 20 and passed to an oil/solvent separation treating zone 26. Solvent impregnated residual solids 28 are passed to a stage desolventizer 30. The miscella 24 which has been passed to the oil/solvent separation treating zone 26 is pre-heated and the pressure in the treating zone is reduced. The oil/solvent separation treating zone 26 may include multiple effect distillation system having different thermodynamic levels.

Ejector steam 32 provides a vacuum which, combined with other heat, results in the vaporization and absorption of extraction solvent vapors from the miscella. The waste ejector steam 34 with solvent vapors and noncondensables is passed in line 36 directly to a sparging plate 38 of a desolventizer-toaster 40. The solvent-laden waste ejector steam 34 is applied to the solvent impregnated residual solids 28 to remove by vaporization the extraction solvent 22 in those residual solids. The waste ejector steam 34, in conjunction with fresh boiler steam 42, is directly applied to the sparging deck 38. The solvent-laden waste ejector steam 34 vaporizes the hexane 22 from the residual solids 28 and forms hexane laden overhead vapors 44. The hexane laden overhead vapors 44 in the desolventizer column 40 are withdrawn and passed to a condenser 46 with the resulting condensate being passed via line 48 to a water separator 50. At the water separator 50, the solvent 22 is recovered and water 52 eliminated. A supply of additional solvent, as required, is introduced via line 54 from solvent supply 56. The resultant extraction solvent stream 22 is then recycled to the solvent extractor 20. Solvent 58 which has been separated from the miscella is passed through solvent condenser 60 and is similarly returned to the water separator 50, leaving partially finished or finished oil or fat 62 to be passed to subsequent processing operations known to those skilled in the art.

The desolventized flake is withdrawn from the desolventizer 40 via line 64 and is passed to further processing, including cooling and storing, as well as further operations for industrial processes. Generally, the oil/solvent separation treatment zone 26 and possibly the desolventizer 40 are operated under sub-atmospheric pressure by use of steam jet ejectors to obtain the pressure condition.

Although FIG. 1 shows a direct application of solvent-vapor laden waste ejector steam 34 to a sparging deck 38 of a desolventizer-toaster 40, in FIG. 2 steam jet ejectors 66 are shown which may be employed in the desolventizer 40. Such jet ejectors 66 apply the waste ejector steam 34 and boiler steam 42 directly to the residual solids 28 as they are passed by in the desolventizer 40.

Although soybeans have been discussed as the substance on which the extraction operation is to be performed, the substance may also be fish meal, rice powder, and any other oleaginous or fatty material. Moreover, although the solvent has been discussed as hexane, the defatted soybean flakes may be treated with an aqueous alcohol solution to extract the nonproteinaceous matter or other solvents known in the art. The schematic representation which has been described is the simplest system. It is understood that several extractors can be employed, as well as filters, mixing tanks, evaporators, overheaters, heat exchangers, and coolers to work in series. Moreover, the temperature of the extraction changes in accordance with the solvent used. By changing the temperature of the solvent steam and/or the effect of the various vacuum pumps, the temperature of extraction can be changed at will and in accordance with the substance to be treated.

Examples of solvents which may be employed and which are suitable for desolventizing fats and oils are hexane ($C_6H_{14}$) with a mole weight of 86.17, density of 0.660, boiling point 69° Centigrade. Other commerical mixtures of hexane may be employed which have different densities and boiling points. Other solvents which may be employed are carbon disulfide, methanol, ethanol, propanol, dioxane, dimethylsulfide, and the like, trichloroethylene and others. It is to be understood that the temperatures between which extraction may be effected are limited by the condensation temperatures of each solvent at the working pressure which is employed. Temperatures may vary between 30° Centigrade and 120° Centigrade and atmospheric pressure, although typically subatmospheric (one-half atmospheric pressure) may, depending on the particular operation, be increased to several times atmospheric pressure.

Introduction of solvent-laden waste ejector steam into the desolventizer results in a substantial reduction of the steam requirements often by as much as twenty per cent and a resultant decrease in the operating costs of the desolventizer. Moreover, the particular application of solvent-laden waste ejector steam into the desolventizer results in a marked reduction in the waste water discharge from the solvent extraction process. This has the unexpectedly beneficial result of reducing the waste water treatment requirements for the extraction process, thus rendering it even more economical.

EXAMPLE OF THE INVENTION

The following example is illustrative of the conditions of the process and apparatus of the invention, but it is to be understood that they by no means limit the scope thereof.

There was introduced into the extractor 100,000 pounds per hour of dehulled soybean flakes having the following analysis:

| Component | Weight Percentages |
|---|---|
| Fat/Oil | 20 |
| Protein | 40 |
| Water | 10 |
| Other | 30 |

The flakes were passed in countercurrent contact with 90,000 pounds per hour of hexane at a temperature of 140° Farenheit, and 64,000 pounds of miscella were withdrawn therefrom. 126,000 pounds of residual solids and solvent were passed out of the solvent extractor and into the desolventizer-toaster. The oil-solvent miscella separation zone was maintained at a pressure of 10" Hg absolute by a steam ejector. From the total oil-solvent miscella treatment separation zone, 19,200 pounds per hour of finished oil or fat were obtained. Solvent-laden waste ejector steam at a pressure of approximately 130 psig was applied directly to the sparging deck of the desolventizer-toaster. The residual solids at the rate of 126,000 pounds per hour were passed into the desolventizer-toaster at a pressure of approximately 750 mm. of mercury for approximately 30 minutes. The desolventized solids which were recovered were commerically free of solvent.

The foregoing illustrated process and structures were merely exemplary of the many forms of this invention and the various configurations to which it may be adapted. Additional stages, preheaters, and treatment may be added or deleted, all without departure from the scope of this invention. The discussion of the present invention and the specification has been generally in terms of soybeans which have been treated with hexane. Nevertheless, the invention, in its broadest aspects, includes other known or yet to be discovered functionally equivalent treatments for the extraction of fat and oil and the desolventizing of residual solids.

What is claimed is:

1. A process for extracting oils and fats from oleaginous vegetable and fatty animal material and treating defatted residual solids therefrom to form a proteinaceous concentrate comprising:
   (a) contacting said oleaginous vegetable and fatty animal material with an extraction solvent flow under conditions to extract said oils and fats therefrom to form an oil-solvent miscella stream and extraction solvent impregnated defatted residual solids;
   (b) separating said extraction solvent impregnated defatted residual solids from said oil-solvent miscella stream;
   (c) contacting said oil-solvent miscella stream with steam under conditions to separate said oil from said extraction solvent;
   (d) recovering solvent-laden waste steam resulting from step (c);
   (e) combining said solvent-laden waste steam resulting from step (c) with an additional steam; and
   (f) applying said combined additional steam and solvent laden waste steam directly to said extraction solvent impregnated defatted residual solids under conditions to vaporize said extraction solvent from said defatted residual solids.

2. A process as defined in claim 1 wherein said extraction solvent is hexane.

3. A process as defined in claim 1 wherein said oleaginous vegetable material is soybean.

4. A process for extracting oils and fats from oleaginous vegetable and fatty animal material and treating defatted residual solids therefrom to form a proteinaceous concentrate comprising:
 (a) contacting said oleaginous vegetable and fatty animal material with an extraction solvent flow under conditions to extract said oils and fats therefrom to form an oil-solvent miscella stream and extraction solvent impregnated defatted residual solids;
 (b) separating said extraction solvent impregnated defatted residual solids from said oil-solvent miscella stream;
 (c) contacting said oil-solvent miscella stream with steam under conditions to separate said oil from said extraction solvent, wherein said conditions include application of additional steam from a boiler assembly;
 (d) recovering solvent-laden waste steam resulting from step (c); and,
 (e) applying said solvent-laden waste steam directly to said extraction solvent impregnated defatted residual solids under conditions to vaporize said extraction solvent from said defatted residual solids.

5. A process in accordance with claim 4 wherein said solvent-laden waste steam and said additional steam from a boiler assembly are applied through a nozzle array to said residual solids under conditions to extract said solvent from said defatted residual solids within the desolventizer.

6. A process in accordance with claim 5 wherein said solvent-laden waste heat transfer medium and said additional steam from a boiler assembly are applied at a sparging deck of a desolventizer assembly under conditions to extract said extraction solvent from said defatted residual solids.

7. A process for extracting oils and fats from oleaginous vegetable and fatty animal material and treating defatted residual solids therefrom to form a proteinaceous concentrate comprising:
 (a) contacting said oleaginous vegetable and fatty animal material with an extraction solvent flow under conditions to extract said oils and fats therefrom to form an oil-solvent miscella stream and extraction solvent impregnated defatted residual solids;
 (b) separating said extraction solvent impregnated defatted residual solids from said oil-solvent miscella stream;
 (c) contacting said oil-solvent miscella stream with steam under conditions to separate said oil from said extraction solvent;
 (d) recovering solvent-laden waste steam resulting from step (c); and,
 (e) applying said solvent-laden waste steam directly to said extraction, solvent impregnated defatted residual solids under conditions to vaporize said extraction solvent from said defatted residual solids, wherein said desolventizing of a solid may be conducted with a range of pressure from slightly above to slightly below atmospheric pressure.

8. A process in accordance with claim 3 wherein the ratio of extraction solvent to soybean flakes is between 0.7:1 and 4:1 for said process.

9. A process as defined in claim 1 wherein said solvents are chosen from the group of hexane, carbon disulfide, dioxane, dimethylsulfide, trichoroethylene, methanol, ethanol and propanol.

10. A process for treating extraction solvent impregnated defatted residual solids to form a proteinaceous concentrate comprising:
 (a) expressing said extraction solvent impregnated defatted residual solids to separate an oil-extraction solvent miscella stream from said impregnated defatted residual solids; and,
 (b) contacting said extraction solvent impregnated defatted residual solids with a solvent-laden waste steam under conditions to extract said extraction solvent from said defatted residual solids.

11. A process in accordance with claim 10 wherein the extraction solvent is hexane.

12. A process in accordance with claim 11 wherein the defatted residual solid is soybean flakes.

* * * * *